United States Patent
Jansen

(10) Patent No.: US 10,768,276 B2
(45) Date of Patent: Sep. 8, 2020

(54) DECENTRALISED RADAR SYSTEM

(71) Applicant: NXP B.V., Eindhoven (NL)

(72) Inventor: Feike Guus Jansen, Eindhoven (NL)

(73) Assignee: NXP B.V., Eindhoven (NL)

( * ) Notice: Subject to any disclaimer, the term of this patent is extended or adjusted under 35 U.S.C. 154(b) by 220 days.

(21) Appl. No.: 15/706,999

(22) Filed: Sep. 18, 2017

(65) Prior Publication Data

US 2018/0143297 A1    May 24, 2018

(30) Foreign Application Priority Data

Nov. 22, 2016    (EP) ..................................... 16200114

(51) Int. Cl.
*G01S 7/35*    (2006.01)
*G01S 13/931*    (2020.01)
(Continued)

(52) U.S. Cl.
CPC ............ *G01S 7/352* (2013.01); *G01S 13/343* (2013.01); *G01S 13/345* (2013.01); *G01S 13/42* (2013.01);
(Continued)

(58) Field of Classification Search
CPC ...... G01S 7/352; G01S 13/343; G01S 13/345; G01S 13/42; G01S 13/878; G01S 13/931;
(Continued)

(56) References Cited

U.S. PATENT DOCUMENTS 5,402,131 A * 3/1995 Pierce ..................... G01S 13/52
                                                    342/159
5,539,412 A * 7/1996 Mendelson ............ G01R 23/16
                                                    324/76.19
(Continued)

FOREIGN PATENT DOCUMENTS

EP    2462462 B1 * 12/2013 ........... G01S 13/536
EP    3 015 880 A1    5/2016

OTHER PUBLICATIONS

Stove, "Linear FMCW radar techniques" IEE Proceedings F—Radar and Signal Processing, vol. 139, No. 5, pp. 343-350 (Oct. 1992).
(Continued)

*Primary Examiner* — Vladimir Magloire
*Assistant Examiner* — Nuzhat Pervin
(74) *Attorney, Agent, or Firm* — Rajeev Madnawat

(57) ABSTRACT

There is provided a radar sensor and method. The radar sensor comprises a plurality of transmit and receive antennas, a transceiver, a digital signal processor, a filter and an interface. The transceiver is configured to digitize received radar signals to provide a plurality of digital samples. The digital signal processor is configured to form a measurement matrix by transforming the plurality of digital samples into a distance/relative velocity matrix for each combination of the transmit and receive antennas. The filter is configured to identify samples forming the measurement matrix having a signal to noise ratio higher than a threshold value. The interface is configured to transmit the identified samples and their location in the measurement matrix to a remote host
(Continued)

processor configured to further carry out direction of arrival processing on the identified samples.

14 Claims, 6 Drawing Sheets

(51) Int. Cl.
    *G01S 13/34*     (2006.01)
    *G01S 13/87*     (2006.01)
    *G01S 13/42*     (2006.01)
    *G01S 7/03*     (2006.01)

(52) U.S. Cl.
    CPC .......... *G01S 13/878* (2013.01); *G01S 13/931* (2013.01); *G01S 7/03* (2013.01); *G01S 2007/356* (2013.01); *G01S 2013/93271* (2020.01); *G01S 2013/93272* (2020.01); *G01S 2013/93274* (2020.01)

(58) Field of Classification Search
    CPC .................. G01S 7/03; G01S 2007/356; G01S 2013/9375; G01S 2013/9378; G01S 2013/9385
    USPC .......................................................... 342/47
    See application file for complete search history.

(56) References Cited

U.S. PATENT DOCUMENTS

| | | | | |
|---|---|---|---|---|
| 5,563,604 | A * | 10/1996 | Brandao | G01S 13/951 342/159 |
| 5,706,013 | A * | 1/1998 | Melvin | G01S 7/2923 342/159 |
| 6,822,606 | B2 * | 11/2004 | Ponsford | G01S 3/74 342/192 |
| 7,193,558 | B1 * | 3/2007 | Gerlach | G01S 7/295 342/195 |
| 7,439,906 | B1 * | 10/2008 | Blunt | G01S 13/904 342/195 |
| 7,474,257 | B2 * | 1/2009 | Blunt | G01S 7/292 342/134 |
| 8,085,889 | B1 * | 12/2011 | Narayan | G01S 19/22 375/346 |
| 9,541,638 | B2 * | 1/2017 | Jansen | G01S 13/582 |
| 9,947,338 | B1 * | 4/2018 | Koteshwara | G10L 21/0208 |
| 10,009,148 | B1 * | 6/2018 | Chen | H04L 1/0002 |
| 10,031,221 | B2 * | 7/2018 | Evans | G01S 13/723 |
| 2001/0027382 | A1 * | 10/2001 | Jarman | G06K 9/0053 702/179 |
| 2004/0178951 | A1 * | 9/2004 | Ponsford | G01S 3/74 342/192 |
| 2006/0166681 | A1 * | 7/2006 | Lohbihler | H04B 1/69 455/456.2 |
| 2007/0080855 | A1 * | 4/2007 | Gerlach | G01S 7/295 342/195 |
| 2008/0110263 | A1 * | 5/2008 | Klessel | G01S 7/52085 73/602 |
| 2008/0114247 | A1 * | 5/2008 | Urbano | A61B 8/56 600/447 |
| 2008/0114253 | A1 * | 5/2008 | Randall | G01S 7/5208 600/459 |
| 2008/0114255 | A1 * | 5/2008 | Schwartz | A61B 8/4483 600/474 |
| 2009/0027256 | A1 * | 1/2009 | Falk | G01S 13/878 342/107 |
| 2010/0271254 | A1 * | 10/2010 | Kanamoto | G01S 13/931 342/27 |
| 2011/0025546 | A1 * | 2/2011 | Cook | G01S 13/534 342/22 |
| 2013/0201054 | A1 * | 8/2013 | Wang | G01S 13/04 342/93 |
| 2014/0073862 | A1 * | 3/2014 | Rodriguez-Llorente | A61B 5/7228 600/301 |
| 2014/0073874 | A1 * | 3/2014 | Rodriguez-Llorente | A61B 5/7203 600/301 |
| 2014/0073932 | A1 * | 3/2014 | Rodriguez-Llorente | A61B 5/14551 600/476 |
| 2014/0073939 | A1 * | 3/2014 | Rodriguez-Llorente | A61B 5/0205 600/476 |
| 2014/0269851 | A1 * | 9/2014 | Rao | G01S 11/08 375/152 |
| 2015/0070207 | A1 * | 3/2015 | Millar | G01S 13/4454 342/174 |
| 2015/0301167 | A1 * | 10/2015 | Sentelle | G01S 13/888 342/22 |
| 2016/0018511 | A1 * | 1/2016 | Nayyar | G01S 7/352 342/27 |
| 2016/0345286 | A1 * | 11/2016 | Jamieson | G01S 3/023 |
| 2017/0029107 | A1 * | 2/2017 | Emami | G08G 5/0026 |
| 2018/0128915 | A1 * | 5/2018 | Lomnitz | G01S 13/9029 |
| 2018/0210075 | A1 * | 7/2018 | Kim | H04W 4/023 |
| 2018/0299394 | A1 * | 10/2018 | Lomnitz | G01N 22/00 |
| 2019/0120954 | A1 * | 4/2019 | Kim | B64C 39/024 |

OTHER PUBLICATIONS

Rohling, "Radar CFAR Thresholding in Clutter and Multiple Target Situations", IEEE Transactions on Aerospace and Electronic Systems, vol. AES-19, No. 4, pp. 608-621 (Jul. 1983).
Krim et al. "Two decades of array signal processing research: the parametric approach", IEEE Signal Processing Magazine, vol. 13, No. 4, pp. 67-94 (Jul. 1996).
Schmidt, "Multiple emitter location and signal parameter estimation," IEEE Transactions on Antennas and Propagation, vol. 34, No. 3, pp. 276-280 (Mar. 1986).
Hacker et al. "Single snapshot DOA estimation", Adv. Radio Sci., 8, pp. 251-256 (2010).
Li et al. "Software-defined calibration for FMCW phased-array radar", IEEE Radar Conference, Washington, DC, pp. 877-881 (2010).
Schmid et al. "An FMCW MIMO radar calibration and mutual coupling compensation approach", European Radar Conference, Nuremberg, pp. 13-16 (2013).
Lanne et al. "Calibrating an Array with Scan Dependent Errors Using a Sparse Grid", Fortieth Asilomar Conference on Signals, Systems and Computers, Pacific Grove, CA, pp. 2242-2246 (2006).
Heidenreich et al. "Computationally simple criteria for detecting a multi-target scenario in automotive radar array processing", 18th European Signal Processing Conference, Aalborg, pp. 224-228 (2010).

* cited by examiner

DECENTRALISED RADAR SYSTEM

CROSS-REFERENCE TO RELATED APPLICATIONS

This application claims the priority under 35 U.S.C. § 119 of European Patent application no. 16200114.3, filed on Nov. 22, 2016, the contents of which are incorporated by reference herein.

FIELD

The present application relates to radar systems and in particular, but not exclusively to the nodes in a radar system.

BACKGROUND

Radar systems play an important role in intelligent transport solutions and the development of autonomous vehicles. In some cases, the accuracy of these systems may increase with an increase in the number of radar sensors provided in a vehicle. Radar sensors may be spread along the exterior of a vehicle, for example a truck or a car, to provide an object detection coverage spanning 360 degrees. By doing so the vehicle may have a better picture of its surroundings compared to an implementation of fewer sensors. Each sensor may provide a coverage spanning only a fraction of a 360 degree coverage of the area surrounding the vehicle. In some cases, this may be due to the body of the vehicle blocking at least part of the coverage area of a sensor.

The processing of radar signals takes a not insignificant amount of processing power and thus deploying multiple radar sensor necessarily increases the cost of a radar system due to the increase processing power requirement. One option may be to provide centralized processing of the radar data from the sensors. Additionally, it may be desired to miniaturize sensors such that they can fit unobtrusively in the vehicle itself, for example, compared to the traditional locations of existing radar sensors, proposed mounting locations (inside the doors for example) may be space limited. As a consequence the available cooling area of the sensors is reducing and the heat generated inside the sensor becomes a problem. With the introduction of more sensors, the price per sensor starts to impact on the affordability of a radar system.

SUMMARY

According to a first aspect, there is provided a radar sensor comprising: a plurality of transmit and receive antennas; a transceiver configured to digitize received radar signals to provide a plurality of digital samples; a digital signal processor configured to form a measurement matrix by transforming the plurality of digital samples into a distance/relative velocity matrix for each combination of the transmit and receive antennas; a filter configured to identify samples forming the measurement matrix having a signal to noise ratio higher than a threshold value; and an interface configured to transmit the identified samples and their location in the measurement matrix to a remote host processor configured to further carry out direction of arrival processing on the identified samples.

The measurement matrix may be a three dimensional matrix, each dimension of the measurement matrix corresponding to a respective one of distance, velocity and transmit/receive antenna combination. The filter may comprise a first filter component configured to identify two dimensional indices of the measurement matrix at which samples having a signal to noise ratio higher than a threshold value are located. The digital processor may be further configured to generate for each identified two dimensional index, a vector corresponding to the samples located at that index across the third dimension. The interface may be configured to transmit the vector to the host processor.

The first and second dimensions may be distance and relative velocity and the third dimension corresponds to antenna combination. The vectors may correspond to angular snapshots. The first filer component may comprise a threshold function in which a magnitude of the threshold is a multiple of an estimated noise power at the indices of a sample being filtered. The samples may be complex valued data samples. The filter further may further comprise a second filter component configured to carry out fine estimation in at least one of distance and velocity based upon the measurement matrix filtered by the first filter component. The filter may be configured to carry out object detection and the output of the first filter component may comprise multiple detections corresponding to a same correlation peak of the measurement samples.

The second filter component may be configured to identify from the multiple detections, a single detection at the same correlation peak. The second filter component may be configured to transfer at least the single detection to the host processor. Transforming the plurality of digital samples into a distance/relative velocity matrix for each combination of the transmit and receive antennas may comprise carrying out fast fourier transforms on the plurality of digital samples.

According to a second aspect, there is provided a method for a radar sensor having a plurality of transmit and receive antennas, comprising: digitizing by a transceiver, received radar signals to provide a plurality of digital samples; forming by a digital processor, a measurement matrix by transforming the plurality of digital samples into a distance/relative velocity matrix for each combination of the transmit and receive antennas; identifying by a filter, samples forming the measurement matrix having a signal to noise ratio higher than a threshold value; and transmitting by an interface, the identified samples and their location in the measurement matrix to a remote host processor configured to further carry out direction of arrival processing on the identified samples.

The measurement matrix may be a three dimensional matrix, each dimension of the measurement matrix corresponding to a respective one of distance, velocity and transmit/receive antenna combination. The filter may comprise a first filter component configured to identify two dimensional indices of the measurement matrix at which samples having a signal to noise ratio higher than a threshold value are located. The method may further comprise generating by the digital processor, for each identified two dimensional index, a vector corresponding to the samples located at that index across the third dimension. The step of transmitting may comprise transmitting the vector to the host processor.

The first and second dimensions may be distance and relative velocity and the third dimension corresponds to antenna combination. The vectors may correspond to angular snapshots. The filter may comprise a first filer component comprising a threshold function in which a magnitude of the threshold is a multiple of an estimated noise power at the indices of a sample being filtered. The samples may be complex valued data samples. The filter may further comprise a second filter component configured to carry out fine estimation in at least one of distance and velocity based upon the measurement matrix filtered by the first filter component.

The method may further comprise carrying out object detection by the filter and the output of the first filter component may comprise multiple detections corresponding to a same correlation peak of the measurement samples.

The method may further comprise: identifying from multiple detections, a single detection at the same correlation peak wherein the identifying is carried out by the second filter component. The method may further comprise transferring at least the single detection to the host processor. Transforming the plurality of digital samples into a distance/relative velocity matrix for each combination of the transmit and receive antennas may comprise carrying out fast fourier transforms on the plurality of digital samples.

According to a third aspect, there is provided a system comprising: a radar sensor comprising: a plurality of transmit and receive antennas; a transceiver configured to digitize received radar signals to provide a plurality of digital samples; a digital signal processor configured to form a measurement matrix by transforming the plurality of digital samples into a distance/relative velocity matrix for each combination of the transmit and receive antennas; a filter configured to identify samples forming the measurement matrix having a signal to noise ratio higher than a threshold value; and an interface configured to transmit the identified samples and their location in the measurement matrix to a remote host processor configured to further carry out direction of arrival processing on the identified samples; the system further comprising: a host processor configured to receive the identified samples and their location in the measurement matrix. The host processor may be further configured to carry out further angle of arrival processing on the identified samples and locations.

FIGURES

Embodiments will be described, by way of example only, with reference to the drawings, in which.

It will be appreciated that for features that span more than one drawing like reference numerals indicate the like features.

DETAILED DESCRIPTION

The requirements of radar sensors are moving towards smaller, cheaper sensors that produce less heat. One aspect contributing to the cost and size as well as heat producing characteristics of a sensor is the processing intensity carried out at the sensor. In some examples, the processing intensity of the sensor may be reduced by locating the processing at a centralised host processor. The host processor may be positioned in an area of the vehicle allowing a larger for heat dissipation. As the host processor is shared between the sensors, the cost due to processing power of the system may be reduced as the processing power need not be duplicated for each sensor.

However, the amount of data processing in a radar system is large. Transferring data from a sensor to a host processing may necessitate the use of expensive interfaces that are configured to transfer large amounts of data. This may increase the price of the radar system.

The present application presents a balance between the amount of processing that takes place at a sensor and the amount of processing carried out at a centralized processor. This may correspond to a trade-off between the amount of local processing carried out at a sensor and required data transfer speed for an interface between the sensor and the host processor.

Embodiments of the present application propose that a sensor carries out local processing to provide a measurement matrix by transforming received radar signal samples into a velocity/distance matrix for each combination of the receive and transmit antennas of the sensor. A filter may then identify samples forming the measurement matrix having a signal to noise ratio higher than a threshold value. The identified samples and their location in the measurement matrix may be provided to a host processor via an interface. The host processor may then carry out more processor intensive processing, such as direction of arrival processing, on the identified samples and location information.

The filter may be a non-linear digital filter and may be used to select only samples which have a signal to noise ratio that is sufficiently high for reliable further processing. This filter may indicate the indices or location in the measurement data matrix of the samples or values to be sent to the host processor.

In this manner, instead of requiring an interface with a data transfer rate sufficient to transfer all the raw measurement data from the sensor, the data is filtered to identify samples with a signal to noise ratio indicative of a potential object detection. The result amount of transferred data is less than if the raw measurement data was transferred to the host processor.

Figure 1:
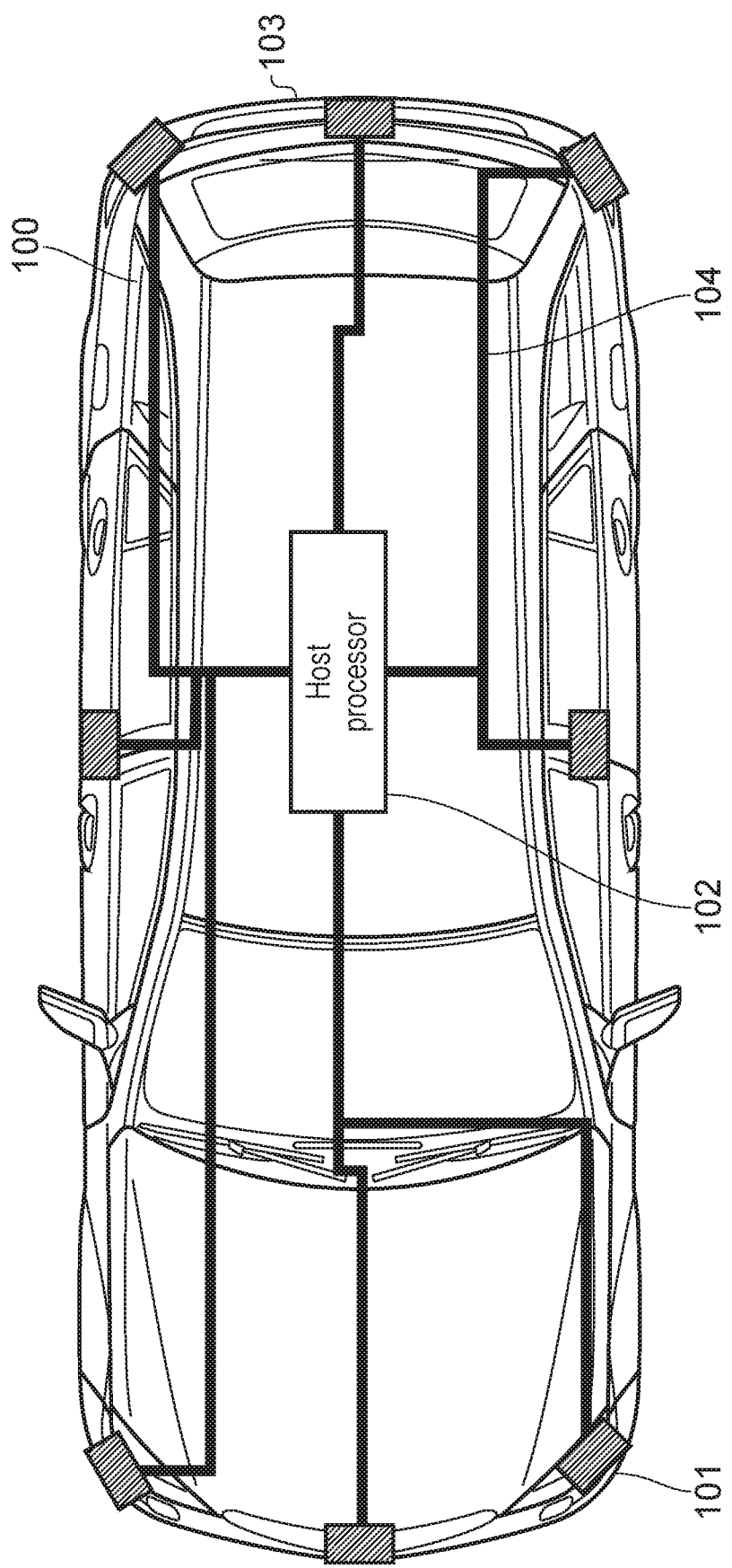
FIG. 1 shows an example of a radar system.

FIG. 1 shows an example of a radar system 100 comprising a plurality of remote radar sensors 101 and a centralised or host processor 102 implemented in a vehicle 103. The sensors 101 may be located at different positions in the vehicle 103 in order to provide a combined broader coverage of the area surrounding the vehicle 103. The host processor 102 may be in a position of the vehicle 103 that is less space restrictive than the positions of the sensors. Thus the host processor may have a larger area for heat dissipation and may be implemented with a higher processing power.

Each of the sensors 101 may be provided with an interface 104 to the host processor 102. In this example, the interface 104 is implemented as a network, however it will be appreciated that other topologies or types of interfaces may be used. In a particular example, the interface may be a controller area network (CAN) and may comprise a CAN bus. In some examples the network may be a CAN flexible data rate (FD) network.

Figure 2:
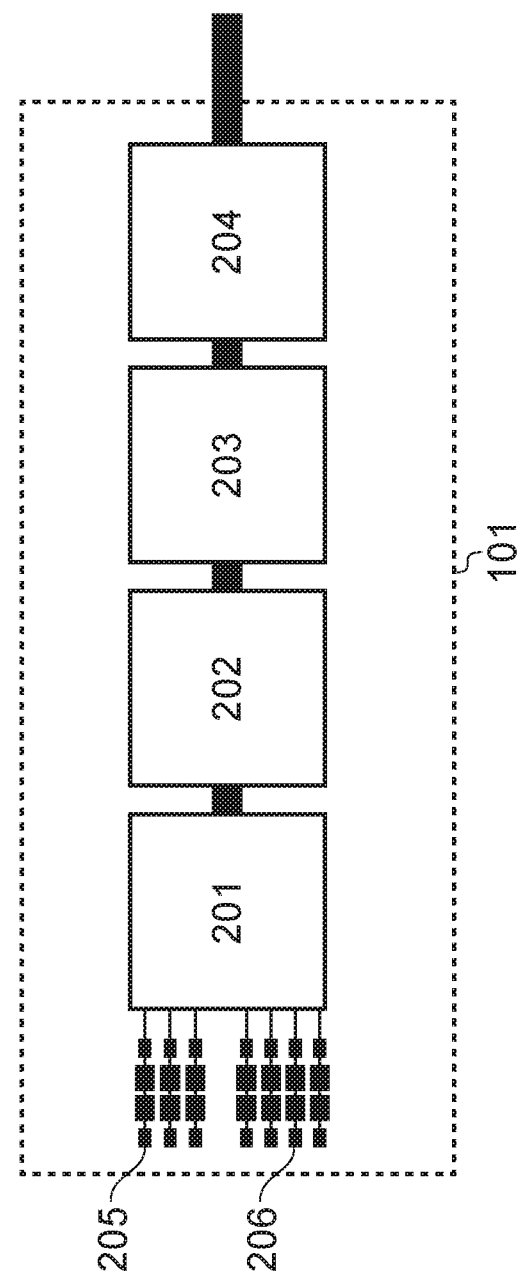
FIG. 2 is a schematic diagram depicting a sensor according to an embodiment.

FIG. 2 shows an example of radar sensor 101 according to an embodiment. The radar sensor 101 comprises a plurality of transmit antennas 205 and a plurality of receive antennas 206. The receive and transmit antennas 205 and 206 are coupled to a radar radio frequency transceiver 201. The transceiver 201 may receive radar signals at the receive antennas and convert the analog received signals to digital samples. The digital samples may be provided to a digital signal processor 202. The digital signal processor 202 may receive the digital samples carry out a transformation from the time domain to the distance domain and derivate (relative velocity) for each combination of the receive and transmit antennas 205 and 206. The transformation may result in a two dimension matrix comprising distance and relative velocity information for each combination of the receive and transmit antennas. A filter 203 may then filter the distance/relative velocity matrices to identify samples that have a signal to noise ratio higher than a threshold value. An interface 204 may then transfer these identified samples and their associated locations in all the matrices to a host processor.

For clarity, only the parts of the sensor 101 useful for explanation of the one or more embodiments have been depicted in FIG. 2. However, it will be appreciated that the sensor 101 may comprise further components for example relating to the generation and transmission of a radar signal or for example a power management component. In some examples one or more of these components may be integrated circuits.

Figure 3:
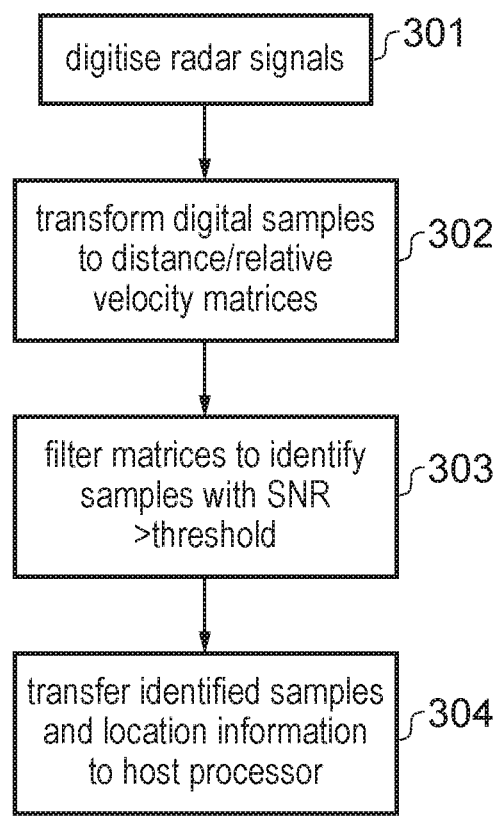
FIG. 3 is a flow chart depicting method steps that may be carried out in some embodiments.

FIG. 3 is a method diagram depicting the method steps carried out by a radar sensor in accordance with an embodiment.

At step 301, radar signals received at the sensor 101 are digitised. For example the analog signals may be converted by an analog to digital converter to form digital samples. At step 302, a transformation is carried out on the digital samples. The transformation may transform the digital sample into two-dimensional distance/relative velocity matrices for each combination of receive and transmit antennas of the sensor. It will be appreciated that the relative velocity is a derivative of the distance. The distance/velocity matrices for each transmit and receive antenna combination may together form a measurement matrix.

At step 303, the matrices may be filtered to identify samples with a signal to noise ratio (SNR) above a threshold value. In some examples, the filter may comprise comparing samples to the threshold. At step 304, the identified samples are transferred to the host processor. The identified samples may be transferred along with further information about the samples, for example a distance or velocity which may correspond with the location of the samples in the matrices. The further information may include a quality indication of the samples, for example a SNR.

The radar system 100 may be configured to process reflected signals received at the radar sensors 101 to determine a distance to an object, the relative radial velocity and/or angle between the object and the radar system (or for example the vehicle). In embodiments, part of the digital processing of the received reflected signal(s) may be carried out locally at a sensor 101 and measurement data filtered to provide sufficient data to a host processor so that it can carry out further or advanced processing while still balancing the transfer speed required of an interface between the host processor 102 and sensor 101.

It will be appreciated that embodiment of the present application may be applicable to different types of sensor systems. A detailed example of a radar system is now discussed.

In an example embodiment of a radar system, the radar sensor 101, may transmit a radar signal which is reflected back to the sensor by objects in the surrounding environment. The received or reflected radar signal(s) may be down converted to baseband signals by an analogue receiver 201 at the sensor 101. The down-converted signal may be processed by a digital part of the sensor, for example the digital signal processor 202. The transmitted radar signal may be modulated according to a specific waveform principle and transmitted at a certain carrier frequency. In one example, this frequency may be 79 GHz.

One example of the radar signal may be a frequency modulated continuous wave (FMCW). FMCW may be a suitable waveform for automotive radar systems due to its accuracy and robustness. In some examples the radar signal may be implemented as a sequence of short duration frequency chirps. In general in the radar system 100, the radar signal or waveform may be transmitted from the transmit antennas 205. The signal received at the receive antennas 206 is delayed in time with respect to the transmitted signals. The time delay is due to the propagation time between the radar system and the reflecting object in the forward and backward direction.

In a FMCW system a sine wave with an increasing or decreasing frequency is transmitted. In the down conversion operation the transmitted signal is mixed with the time delayed transmitted signal in the analog domain. In case the relative velocity between the radar system and the reflecting object is zero the time delayed signal is an attenuated and phase rotated version of the transmitted signal.

Figure 4:
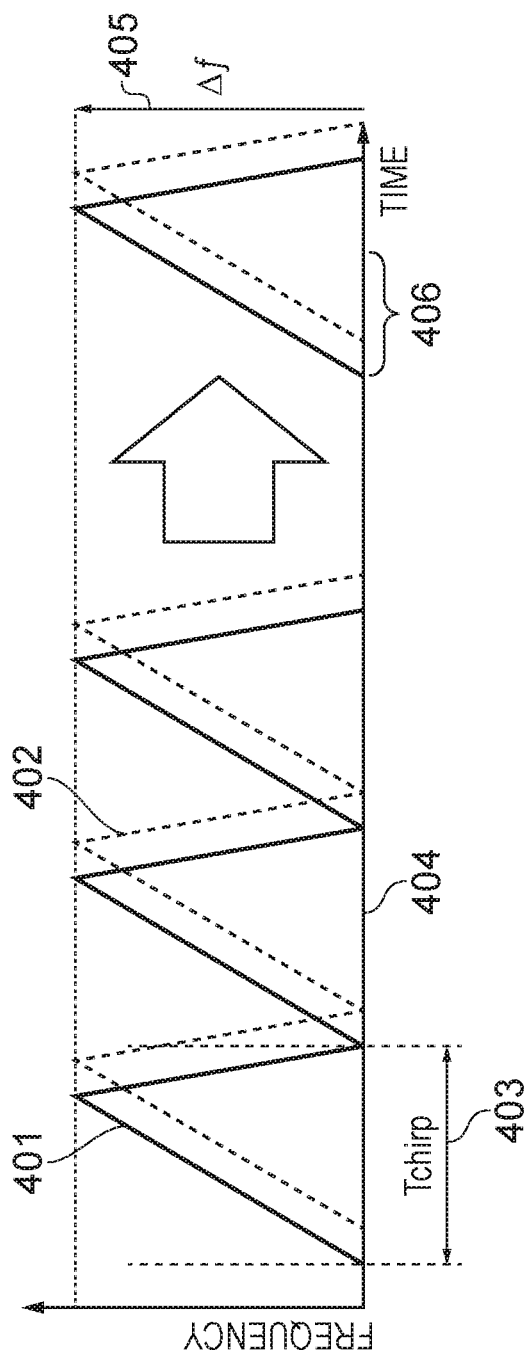
FIG. 4 is a graph showing an example of a radar waveform.

FIG. 4 shows an example of a transmitted waveform 401 and received waveform 402. The x-axis corresponds to time with the y-axis corresponding to frequency. FIG. 4 shows a plurality of chirps 404 for each of the transmitted 401 and received 402 waveforms, where each chirp has a chirp duration 403. It can be seen that in accordance with FMCW, each chirp consists of a signal increases in frequency and then decreases in frequency for the chirp duration 403. The increase in frequency of a ramp of the chirp is shown at 405 as $\Delta f$ and the duration of the ramp ($T_{ramp}$) is shown at 406. The instantaneous frequency difference between transmitted signal 401 and received signal 402 may be constant for at least part of the duration of a frequency ramp. From FIG. 4, it can be seen that the received signal 402 may correspond to a time-delayed version of the transmitted signal 401.

The result of the down conversion operation is a sine wave oscillating at the so called beat frequency. The frequency depends on the distance to the reflecting object D the difference between the start and the stop frequency of the ramp $\Delta F$ and the duration of the ramp $T_{ramp}$:

$$f_{beat} = \frac{\Delta F}{Tramp} \frac{2D}{c0} \qquad (1)$$

where c0 is equal to the speed of light. In case the relative velocity is non-zero the corresponding Doppler frequency is added to the beat frequency. In this example however the duration of the chirp may be very short, for example, shorter than 100 μs and the frequency deviation may be at least several tens of MHz. As a result the Doppler frequency is very small compared to the beat frequency and can be ignored in the calculation of the distance. The Doppler component will, however, change the phase of the received frequency ramp.

In order to convert the down-converted and digitized samples of the received signal, the samples may be transformed from the time domain to the distance domain and the derivative of the distance—relative velocity. One example of this transformation may be the two dimensional Fast Fourier Transformation (FFT) to calculate the relative radial velocity. However it will be appreciated that other types of transforms may occur corresponding to other types of radar waveforms.

Figure 5:
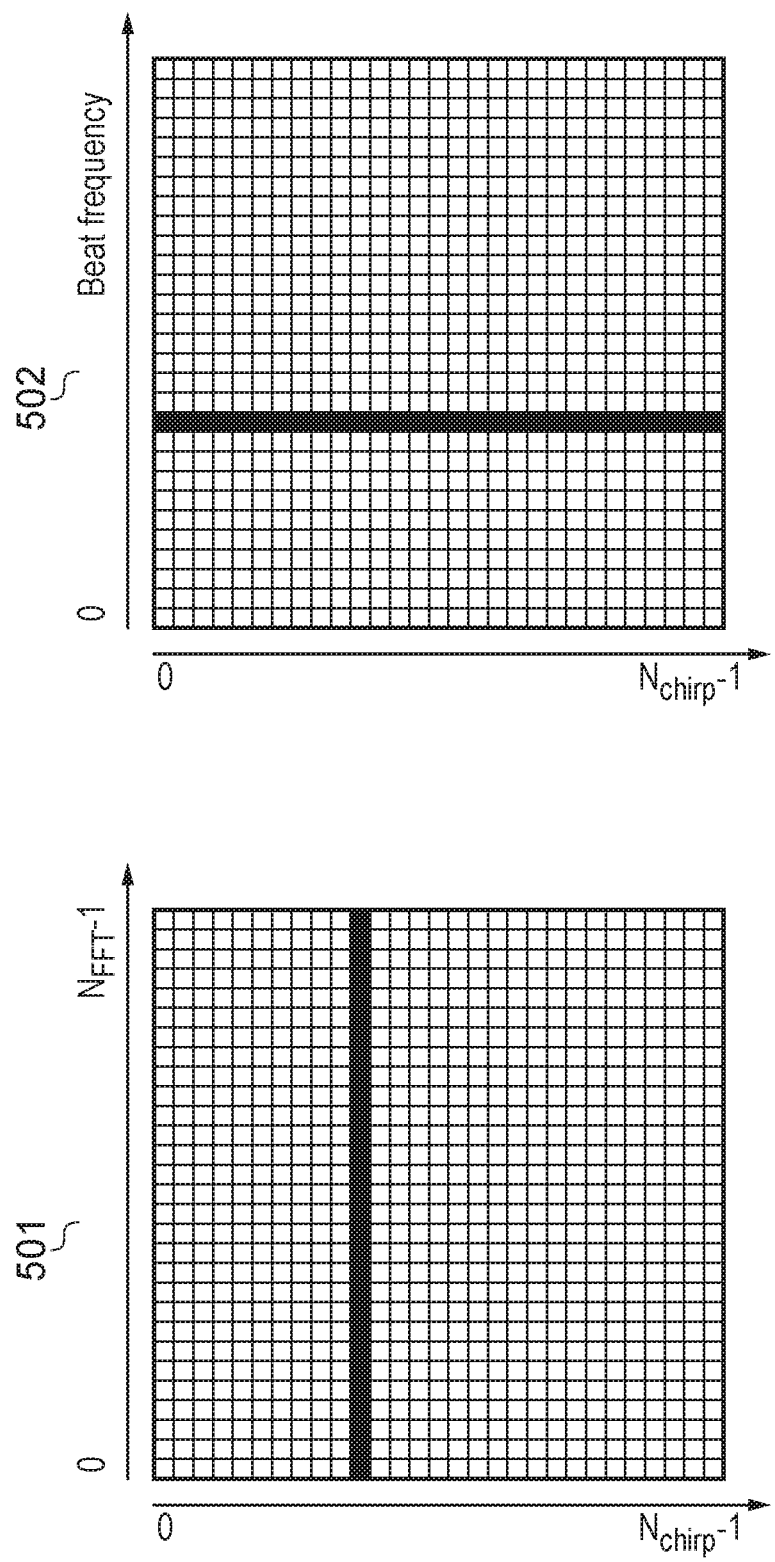
FIG. 5 shows and example of the creation of a distance/relative velocity matrix.

FIG. 5 shows an example of this two dimensional FFT calculation. The digital signal processor 202 may calculate an FFT on a set of data samples corresponding to each transmitted FMCW chirp in a sequence of FMCW chirps. Each row in step 1 501 corresponds to one of the FMCW chirps in the sequence. Each resulting frequency sample of the FFT corresponds to a specific received beat frequency and hence a range, resulting in a series of range gates.

Once all of the FMCW chirps in the sequence have been received and processed using an FFT, the digital signal processor 202 may then in step 2 502 perform an FFT on data samples in the columns. This second FFT determines the contribution of the Doppler effect on the frequency of the received signal due to any relative velocity between the radar system 100 and the reflector. The result is a 2 dimensional distance/velocity matrix.

This transformation does not decrease the amount of data, rather it may increases it due an increase in the required precision. The increase in precision is due to the reduced noise bandwidth after processing and the coherent addition of sine wave like signals.

In this example so far, the relation between the distance and the beat frequency has been assumed to be linear. The beat frequency increases with increasing distance to the reflecting object. In practice multiple reflections can be present in the field of view of the radar system. In this case the output of the down conversion operation is a summation of sine waves oscillating at the beat frequencies corresponding to the distances to the reflecting objects.

In the example sensor 101, there are a plurality of transmit antennas 205 and a plurality of receive antennas 206. Using multiple antennas may allow the angle of arrival of the reflected radar signal to be estimated. Thus a transformation to the distance/relative velocity matrix may be carried out for the different combinations of the transmit and receive antennas. The result is a plurality of two dimension matrices which may be concatenated together to form a three-dimensional matrix. Each dimension of the 3D matrix may correspond to a respective one of distance, relative velocity and antenna combination. The 3D matrix may be considered to be measurement matrix as it comprises measurement data, for example corresponding to distance, relative velocity and antenna combination information.

Figure 6:
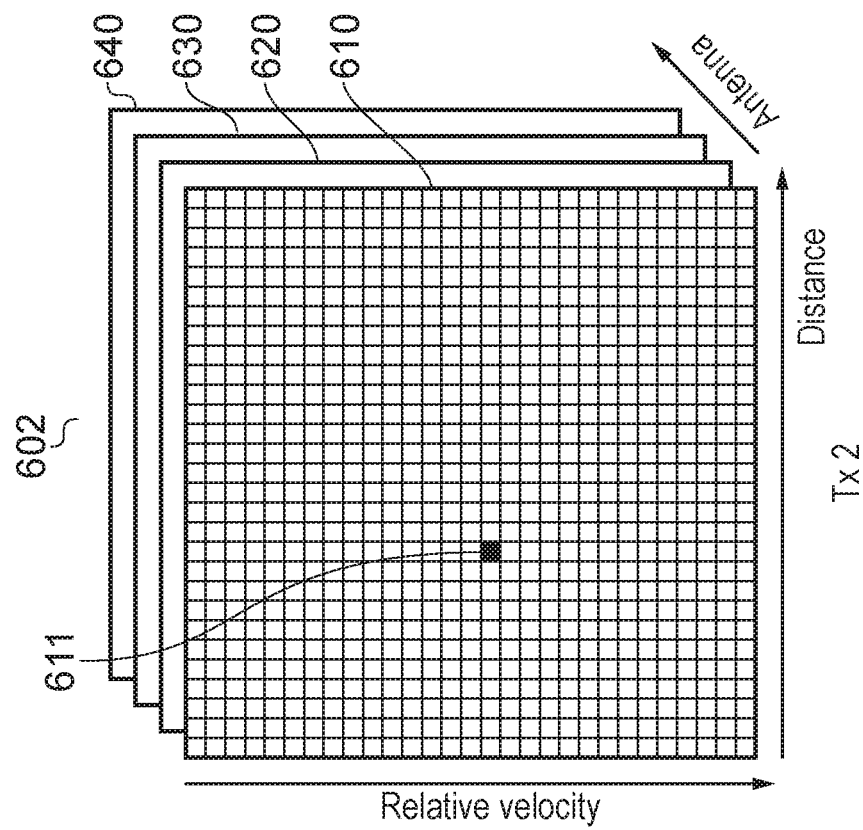
FIG. 6 shows examples of a concatenated measurement matrix.
Figure 6:
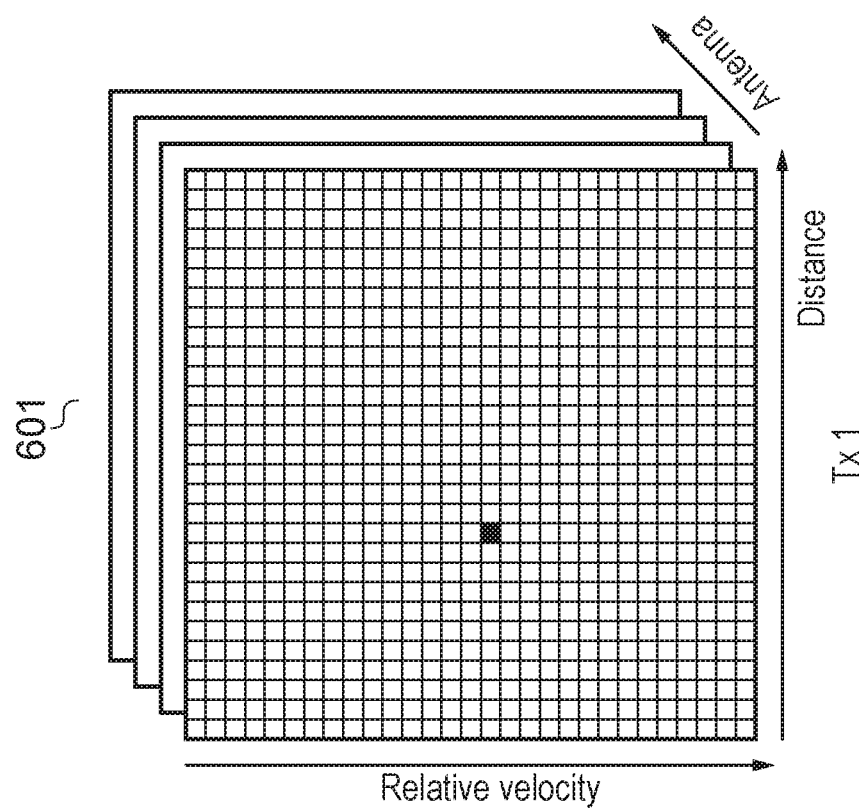

FIG. 6 shows an example of measurement matrices for a radar system with two transmit antennas 205 and four receive antennas 206. The first measurement matrix 601 corresponds to the combinations of the receive antennas 206 with the first transmit antenna. The second measurement matrix 602 corresponds to the combinations of the receive antennas 206 with the second transmit antenna. Each measurement matrix in this example comprises four 2D distance/relative velocity matrices, one for each receive antenna in combination with the respective transmit antenna. It will however be appreciated that different antenna arrangement will give rise to different antenna combinations and resulting measurement matrices.

Referring back to FIG. 2, in this example, once the digital signal processor has generated a measurement matrix, the measurement matrix may be filtered by the filter 203. The filter 203 may identify samples in the measurement matrix having a SNR that is above a threshold value. The threshold value may be set to identify those samples which are likely to correspond to an object in the radar field of vision. The filter 203 may additionally note an index or location in the measurement matrix of the identified samples.

The two-dimensional distance-Doppler or relative velocity matrices may be made up of a plurality of sampling points. Most of these samples only represent a noise signal as the space between reflecting objects is empty. These empty space samples do not represent any useful information and can be removed from the data. To remove the empty space samples each sample may be tested for the presence of a reflecting object. This test may be executed by comparing the signal power of each sample with the noise power at this sampling point. In case that the signal power at a certain sampling point exceeds a pre-defined multiple of the estimated noise power at this sampling point a positive detection is declared. However, a single reflection from an object may cause multiple positive detections. This is due to the finite resolution caused by the pre FFT windowing operation. Therefore further, more intensive processing may be carried out on the measurement data. In examples of the present application, this more intensive processing may be carried out at the host processor.

The interface 204 may be configured to transfer the samples at the identified indices in the measurement matrix to a host processor 102. In addition to the samples, the interface 204 may provide information associated with the identified samples. This information may correspond to information required by the host processor to further process the samples. The information may correspond to a quality of the sample, for example the SNR of the sample. The information may further correspond to index information or information derived from the location of the sample within the measurement matrix, for example information corresponding to distance and/or relative velocity.

The 3D measurement matrix may be considered to comprise a plurality of 2D matrixes concatenated together. In the above example, 2D distance/relative velocity matrices were discussed as making up the measurement matrix, however it will be appreciated that the data in the measurement matrix may also correspond to a plurality of 2D distance/antenna combination matrices and a plurality of 2D relative velocity/antenna combination matrices. It will also be appreciated that samples along a third dimension of the measurement matrix that are at the same index in the first and second dimension will form a vector. The filter may identify samples by identifying vectors in the measurement matrix. The filter may do this by filtering a 2D matrix forming part of the measurement matrix, identifying an index in the 2D matrix of a sample with a SNR above a threshold value and identifying a vector of samples along the third dimension at the index in the first and second dimension.

For example, FIG. 6 shows a case where the filter has filtered a two dimensional matrix corresponding to a distance/relative velocity matrix 601. A sample 611 has been identified within that matrix at a first index. The first index is an index in the distance and relative velocity dimensions. The filter may then identify a vector comprising samples at the first distance/relative velocity index for the distance/relative velocity matrices 620, 630, 640 corresponding to the different antenna combinations. It will be appreciated that while a vector of matrix 602 has been described, similar steps may generate a vector corresponding to the matrix 601.

It will however be appreciated that the filter may slice the measurement matrix into two dimensional matrices and identify a resulting vector. For example in another example, the filter may filtered a two dimensional matrix corresponding to a velocity/antenna combination matrix. A sample may be identified within that matrix. The filter may then identify a vector comprising samples within this matrix corresponding to velocity index at which the object was detected and covering all antenna combination indices.

In a more detailed example, the samples of each two-dimensional distance/velocity matrix may be converted to power samples. The power samples at equal distance/velocity from each of the N antennas may be added and the filter may then operate on the resulting single distance/velocity (power) matrix. The position of the samples corresponding to an object detected via the threshold is used to identify samples in the original distance/velocity matrices for the N antennas. These samples are then sent to the host processor.

In another more detailed examples, a third transformation is executed along the antenna dimension of the three dimensional matrix. This third transformation may be executed for all distance/velocity combinations and can be in the form of an FFT in some examples. Then the filter may operate on the N distance/velocity matrices (corresponding to N antennas). The position in a distance/velocity matrix at which samples exceed the SNR threshold is used to identify samples to be sent to the host processors. Samples at the identified position along the antenna dimension may be sent.

The identified samples, indices and/or vectors may be provided to the host processor via the interface. As discussed, in some examples, the interface may be a CAN interface.

In some examples, the sensor 101 may further be configured to carry out calibration of the antenna array. For example, the calibration may include unequal antenna feedline length correction, gain and phase correction of the receiver and transmitters and/or (angle dependent) mutual coupling correction. Doing antenna calibration in the sensor module may create a separation of concern between developers of the sensor module and host processor.

The host processor may carry out further processing on the samples. For example, the host processor may have the processing capabilities to run advanced algorithms. The host processor may further combine samples from a plurality of the sensors 101 and process these samples.

In one example, the host processor 102 may carry out direct of arrival (DOA) processing on the samples.

A so called angular snapshot vector for certain distance velocity combination is formed by concatenating the complex valued samples from the 2D distance/relative velocity matrix corresponding to the different antenna combinations. Here the sample in each matrix may be taken at the indices indicated by the desired distance and relative velocity. In examples where the filter identifies an index of a sample in the distance/relative velocity matrix and generates a vector along the antenna dimension, the host processor will receive angular snap shot vectors. In other examples, the host processor may receive the identified samples from the sensor 101 and generate angular snapshot vectors from those samples.

In DOA processing an important aspect is the angular resolution, e.g. the capability of the system to detect to signals in close angular proximity. Low complexity DOA processing techniques are limited to the Rayleigh resolution given by (2) for a uniformly spaced array with half a wavelength spacing.

$$\varphi_{res} = 180 \frac{\lambda}{\pi N_{Tx} N_{Rx} d \cos(\varphi)} \quad (2)$$

Where $\lambda$ represents the wavelength, $\varphi$ the direction of arrival, and $N_{Tx}$ and $N_{Rx}$ represent the number of transmit and the number of receive antennas respectively. However, the resolution isn't limited to the Rayleigh limit. Rather a lower bound is formed by the Cramer-Rao lower bound on the variance of the DOA estimator. To achieve this bound more complex algorithms such as the MUSIC algorithm can be applied. By providing the identified samples to the host processor 102, the host processor may carry out these algorithms of higher complexity. The host processor 102 in some examples may carry out DOA processing in dependence on the receive samples and in some cases angular snapshots provided by the received samples.

In some examples, the host processor 102 may further be configured to perform a check on a multi-target bit. If the received samples indicate that multiple targets could be present at this distance velocity combination then the host processor may carry out a high resolution angle of arrival algorithm, for example the MUSIC algorithm. In other examples, the host processor 102 may execute its own algorithm to check for multiple targets based up on the raw data of each target.

In the foregoing, the filter 204 has been described. In some examples, the filter may be a non-linear digital filter. The filter may comprise a threshold function in which the magnitude of the threshold is a multiple of the estimated noise power at the indices of the sample under test. In other examples, the filter block may comprise a second filter component for the fine estimation in distance, velocity, angle of arrival in the azimuth and elevation based upon multiple detections corresponding to the same correlation peak. As per the above embodiments, only the complex valued, data samples in the distance and relative velocity domain are transferred corresponding the sample with the highest signal to noise ratio. The second filter component may provide additional information to the host processor regarding fine distance estimation, fine velocity estimation, fine angle of arrival estimation in the azimuth and elevation and/or quality indication. It will be appreciated that the second filter component may be optional and alternatively, the host processor may carry out corresponding fine estimation functionality.

In the foregoing a radar system comprising a plurality of sensors and a central host processor has been described. In some examples a radar sensor or sensor module may include an RF transceiver, analogue to digital converter, digital signal processor and data interface to a host processor. The sensor may transmit a sequence of radar waveforms and receive (multiple) time delayed, frequency shifted, attenuated and phase shifted versions of these waveforms after reflection by an object in the radar field of view. The sensor module may digitize these received signals by using the analogue to digital converter. The digitized signals may be processed by the digital signal processor. The digital signal processing may include at least a transformation from the time domain basis to the distance domain basis and its derivative (relative velocity) domain basis.

The samples in the distance and velocity domain may be non-linearly filtered. The filter may consists of a threshold function in which the magnitude of the threshold is a multiple of the estimated noise power at the indices of the sample under test. A digital data interface may be between the radar sensor module and the host processor over which the complex valued, data samples in the distance and relative velocity domain may be transferred corresponding only to the indices in these domains for which the threshold test was positive (sample exceeds the threshold). In some examples, additional information describing the samples including some of the following: distance, velocity, angle of arrival in the azimuth and elevation and quality indication, i.e. signal to noise ratio may be send to the host processor. Complex valued data samples in the distance and relative velocity domain may be transmitted for each antenna combination.

The sensor module may further include a second digital filter in some cases. The second digital filter may perform a fine estimation in distance, velocity, angle of arrival in the azimuth and elevation based upon multiple detections corresponding to the same correlation peak. Furthermore, only the complex valued, data samples in the distance and relative velocity domain may be transferred corresponding the sample with the highest signal to noise ratio. In some cases, additional information describing this sample including some of the following: fine distance estimation, fine velocity estimation, fine angle of arrival estimation in the azimuth and elevation and quality indication, i.e. signal to noise ratio may be send to the host processor.

The invention claimed is:

1. A radar sensor comprising:
a plurality of transmit antennas;
a plurality of receive antennas;
a transceiver configured to digitize received radar signals to provide a plurality of digital samples;
a digital signal processor configured to form a measurement matrix by transforming the plurality of digital samples into two dimensional distance/relative velocity matrices and then concatenating the two dimensional distance/relative velocity matrices for each combination of the plurality of transmit antennas and the plurality of receive antennas, wherein the measurement matrix is a three dimensional matrix, each dimension of the three dimensional matrix respectively corresponding to a distance, a relative velocity, and a transmit/receive antenna combination;
a filter configured to identify samples of the plurality of digital samples having a signal to noise ratio higher than a threshold value by filtering the two dimensional distance/relative velocity matrices; and
an interface configured to transmit the identified samples and their location in the measurement matrix to a remote host processor configured to further carry out direction of arrival processing on the identified samples.

2. The radar sensor of claim 1, wherein the filter further comprises:
a first filter component configured to identify two dimensional indices of the measurement matrix at which samples having the signal to noise ratio higher than the threshold value are located.

3. The radar sensor of claim 2, wherein the digital processor is further configured to generate, for each identified two dimensional index, a vector corresponding to samples located at that identified two dimensional index across the third dimension.

4. The radar sensor of claim 3, wherein the interface is further configured to transmit each vector to the host processor.

5. The radar sensor of claim 3, wherein the first and second dimensions respectively correspond to the distance and the relative velocity and the third dimension corresponds to the transmit/receive antenna combination.

6. The radar sensor of claim 5, wherein the vectors respectively correspond to angular snapshots.

7. The radar sensor of claim 2, wherein the first filter component comprises a threshold function in which a magnitude of the threshold is a multiple of an estimated noise power at indices of a sample being filtered.

8. The radar sensor of claim 1, wherein the plurality of digital samples are complex valued data samples.

9. The radar sensor of claim 2, wherein the filter further comprises:
a second filter component configured to carry out fine estimation in at least one of the distance and the relative velocity based upon the measurement matrix filtered by the first filter component.

10. The radar sensor of claim 9, wherein the filter is further configured to carry out object detection and the output of the first filter component may comprise multiple detections corresponding to a same correlation peak of the measurement samples.

11. The radar sensor of claim 10, wherein the second filter component is further configured to identify from the multiple detections, a single detection at the same correlation peak and the interface is further configured to transfer at least the single detection to the host processor.

12. The radar sensor of claim 1, wherein transforming the plurality of digital samples into the two dimensional distance/relative velocity matrices for each combination of the transmit and receive antennas further comprises:
carrying out fast Fourier transforms on the plurality of digital samples.

13. A method for a radar sensor having a plurality of transmit antennas and a plurality of receive antennas, the method comprising:
digitizing by a transceiver, received radar signals to provide a plurality of digital samples;
forming by a digital processor, a measurement matrix by transforming the plurality of digital samples into two dimensional distance/relative velocity matrices and then concatenating the two dimensional distance/relative velocity matrices for each combination of the plurality of transmit antennas and the plurality of receive antennas, wherein the measurement matrix is a three dimensional matrix, each dimension of the three dimensional matrix respectively corresponding to a distance, a relative velocity, and a transmit/receive antenna combination;
identifying by a filter, samples of the plurality of digital samples having a signal to noise ratio higher than a threshold value by filtering the distance/relative velocity matrices; and
transmitting by an interface, the identified samples and their location in the measurement matrix to a remote host processor configured to further carry out direction of arrival processing on the identified samples.

14. A system comprising:
a radar sensor comprising:
a plurality of transmit antennas;
a plurality of receive antennas;
a transceiver configured to digitize received radar signals to provide a plurality of digital samples;
a digital signal processor configured to form a measurement matrix by transforming the plurality of digital samples into two dimensional distance/relative velocity matrices and then concatenating the two dimensional distance/relative velocity matrices for each combination of the plurality of transmit antennas and the plurality of receive antennas, wherein the measurement matrix is a three dimensional matrix, each dimension of the three dimensional matrix respectively corresponding to a distance, a relative velocity, and a transmit/receive antenna combination;
a filter configured to identify samples of the plurality of digital samples having a signal to noise ratio higher than a threshold value by filtering the two dimensional distance/relative velocity matrices; and an interface configured to transmit the identified samples and their location in the measurement matrix to a remote host processor configured to further carry out direction of arrival processing on the identified samples; the system further comprising:
a host processor configured to receive the identified samples and their location in the measurement matrix.

\* \* \* \* \*